No. 619,362. Patented Feb. 14, 1899.
H. STEVENSON.
PORTABLE STAND OR SUPPORT.
(Application filed July 27, 1898.)
(No Model.)
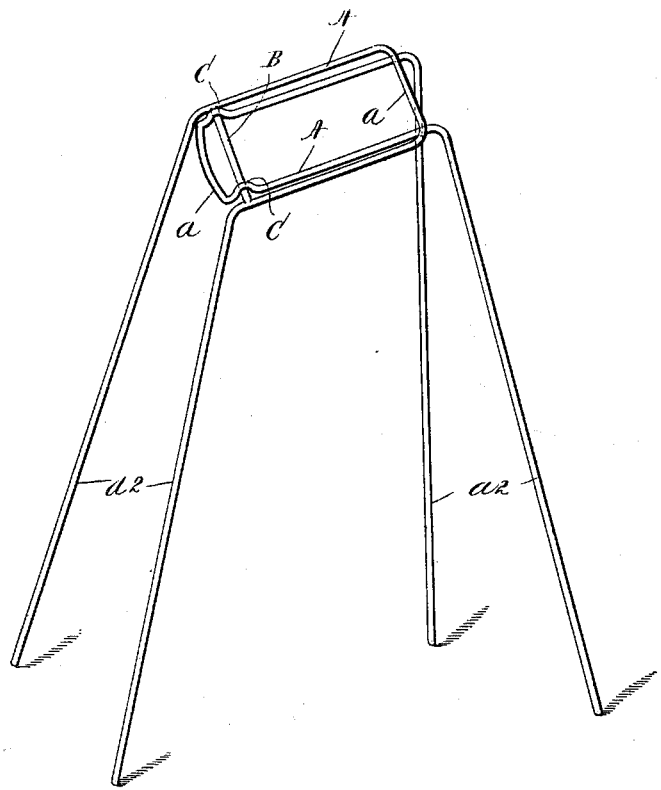
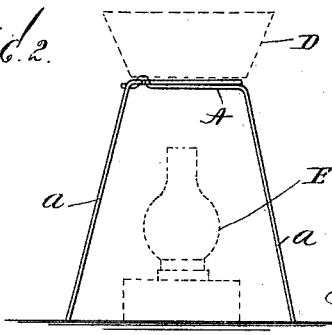
WITNESSES
John Buckler,
F. A. Stewart
INVENTOR
Hugh Stevenson
BY
Edgar Tate & Co.
ATTORNEYS
THE NORRIS PETERS CO., PHOTO-LITHO., WASHINGTON, D. C.

UNITED STATES PATENT OFFICE.

HUGH STEVENSON, OF NEW YORK, N. Y.

PORTABLE STAND OR SUPPORT.

SPECIFICATION forming part of Letters Patent No. 619,362, dated February 14, 1899.

Application filed July 27, 1898. Serial No. 687,005. (No model.)

*To all whom it may concern:*

Be it known that I, HUGH STEVENSON, a citizen of the United States, residing at New York, in the county of New York and State of New York, have invented certain new and useful Improvements in Portable Stands or Supports, of which the following is a full and complete specification, such as will enable those skilled in the art to which it appertains to make and use the same.

This invention relates to portable stands or supports; and the object thereof is to provide an improved device of this class which may be used for many purposes and which is especially designed for use as a support for vessels to be heated over a lamp or other heater.

The invention is fully disclosed in the following specification, of which the accompanying drawings form a part, in which—

Figure 1 is a perspective view of my improved stand or support, and Fig. 2 a side view showing one application thereof.

In the drawings forming part of this specification the separate parts of my improvement are designated by the same letters of reference in each of the views, and in the practice of my invention I provide a portable stand which consists of two separate parts each of which is composed of a stiff wire or rod, and in the form of construction shown in the drawings each of said parts or the wire or rod from which each of said parts is formed is first bent centrally to form a yoke-shaped portion A, each of which is provided at one end with a cross-head $a$, and the sides of which opposite the cross-head are bent downwardly to form legs $a^2$.

One of the yoke-shaped portions A adjacent to the end thereof opposite the cross-head $a$ is provided with a cross-brace B, which may be formed integrally therewith or secured thereto in any desired manner, and the other yoke-shaped portion adjacent to the cross-head $a$ thereof is provided at each side with an upwardly-curved loop C, in which the brace B is adapted to rest.

In practice one of the yoke-shaped portions A is made narrower than the other, and in connecting said separate parts to form the stand or support the yoke-shaped portion A of one part is passed upwardly through the yoke-shaped portion of the other, and the legs of the narrower part are turned outwardly, so that the brace B, which is connected with the wider part, will enter the loops C, which are formed on the narrower part, and the cross-head $a$ of the wider part will rest on the sides of the narrower part, adjacent to the open end thereof, all of which is clearly shown in the drawings.

This device may be taken apart whenever desired and set up quickly and easily whenever necessary, and it may be used for a variety of purposes, one of which is shown in Fig. 2, in which the said device is used as a support for a pan or other vessel D, as indicated in dotted lines, and beneath the stand or support is placed a lamp E, which is also indicated in dotted lines and by which the pan or other vessel D or the contents thereof may be heated.

My improved stand or support is simple in construction and operation and well adapted to accomplish the result for which it is intended, and is also comparatively inexpensive.

Having fully described my invention, I claim as new and desire to secure by Letters Patent—

1. A stand or support, comprising two separate parts each composed of a stiff wire or rod, and being provided with a yoke-shaped portion, the sides of which opposite the cross-head are bent downwardly to form legs, one of said yoke-shaped portions being also narrower than the other, the wider yoke-shaped portion being provided adjacent to the end with which the legs are connected with a cross-brace, the cross-head of the wider yoke-shaped portion resting upon the horizontal portion of the narrower yoke-shaped portion, and the horizontal portion of the narrower yoke-shaped portion resting upon said cross-brace of the wider yoke-shaped portion, substantially as shown and described.

2. A stand or support, comprising two separate parts, each composed of a stiff wire or rod, and being provided with a yoke-shaped portion, the sides of which opposite the cross-head are bent downwardly to form legs, one of said yoke-shaped portions being also narrower than the other, the wider yoke-shaped portion being provided adjacent to the end with which the legs are connected with a cross-brace, the cross-head of the wider yoke-shaped portion resting upon the horizontal portion of the narrower yoke-shaped portion, and the horizontal portion of the narrower yoke-shaped portion resting upon said cross-brace of the wider yoke-shaped portion and being provided adjacent to the cross-head with loops which correspond with said brace, substantially as shown and described.

In testimony that I claim the foregoing as my invention I have signed my name, in presence of the subscribing witnesses, this 25th day of July, 1898.

HUGH STEVENSON.

Witnesses:
F. A. STEWART,
A. C. McLOUGHLIN.